(12) United States Patent
Wei

(10) Patent No.: US 6,478,227 B1
(45) Date of Patent: Nov. 12, 2002

(54) COMMUNICATION DEVICE FOR STORING PERSONAL OR DEPARTMENT DATA

(75) Inventor: Yao-Ming Wei, Taipei (TW)

(73) Assignee: Teco Image Systems Co., Ltd., Taipei (TW)

(*) Notice: Subject to any disclaimer, the term of this patent is extended or adjusted under 35 U.S.C. 154(b) by 164 days.

(21) Appl. No.: 09/643,937

(22) Filed: Aug. 23, 2000

(51) Int. Cl.$^7$ .................... G06K 19/06; G06K 7/00
(52) U.S. Cl. .................. 235/486; 235/380; 235/492
(58) Field of Search .................... 235/375, 380, 235/382, 486, 487, 492, 441; 358/468, 440, 444, 401

(56) References Cited

U.S. PATENT DOCUMENTS

| | | | | |
|---|---|---|---|---|
| 4,432,020 A | * | 2/1984 | Onose et al. | 358/257 |
| 4,907,274 A | * | 3/1990 | Nomura et al. | 380/30 |
| 5,121,423 A | * | 6/1992 | Morihiro et al. | 379/142 |
| 5,210,621 A | * | 5/1993 | Kinoshita | 358/440 |
| 5,293,256 A | * | 3/1994 | Fukushima et al. | 358/468 |

* cited by examiner

Primary Examiner—Thien M. Le
(74) Attorney, Agent, or Firm—Rosenberg, Klein & Lee

(57) ABSTRACT

A communication device for storing personal or department data is disclosed. A communication machine is installed with an operating panel with a one-touch dial function and a liquid crystal display, which are connected to a circuit control unit. A reading machine is installed in the communication machine. An internal circuit of the reading machine is communicated with the circuit control unit; and at least one card-inserting seat is installed in the communication machine for being inserted by at least one memory card. Each memory card serves to store personal data or department data, use setting values of a device, or data of a telephone book. Each card-inserting seat is connected to the internal circuit of the reading machine. When an operator is desired to user the device, it is only needed to insert the memory card into the card-inserting seat. Thereby, the reading machine reads the data in the memory card, then, the one-touch dial function in the operating panel is replaced by the memory card. On the contrary, the operator may use the functions on the operating panel of the communication machine.

1 Claim, 3 Drawing Sheets

COMMUNICATION DEVICE FOR STORING PERSONAL OR DEPARTMENT DATA

FIELD OF THE INVENTION

The present invention relates to a communication device for storing personal or department data, and especially to a communication device which may present a one-touch dial function and can be operated conveniently.

BACKGROUND OF THE INVENTION

In the general communication equipment, such as the fax machine 60 illustrated in FIG. 1, due to the confinement of the operating panel and the functions, only several tenths one-touch dial functions and one or two hundred simple dials are provided on the operating panel. If the users are too much, the functions on the operating panel are insufficient.

Next, recently, LAN and Internet are used more and more widely. The operations of the fax machines and digital copiers on LAN or Internet increase gradually. Therefore, the function of one-touch dial is confined in general communication device.

Therefore, there is an eager demand for a novel communication device for storing personal or department data, which can be well used in the function of one-touch dials.

SUMMARY OF THE INVENTION

Accordingly, the primary object of the present invention is to provide a communication device for storing personal or department data. A communication machine (for example, a fax machine, a digital copier, a multi-functional product, etc) is installed with an operating panel with a one-touch dial function and a liquid crystal display, which are connected to a circuit control unit. A reading machine is installed in the communication machine. An internal circuit of the reading machine is communicated with the circuit control unit; and at least one card-inserting seat is installed in the communication machine for being inserted by at least one memory card. Each memory card serves to store personal data or department data, use set values of a device, or data of a telephone book. Each card-inserting seat is connected to the internal circuit of the reading machine. When an operator is desired to user the device, it is only needed to inserted the memory card into the card-inserting seat. Thereby, the reading machine reads the data in the memory card, then, the one-touch dial function in the operating panel is replaced by the memory card. On the contrary, the operator may use the functions on the operating panel of the communication machine.

The various objects and advantages of the present invention will be more readily understood from the following detailed description when reading in conjunction with the appended drawing.

DETAILED DESCRIPTION OF THE PREFERRED EMBODIMENTS

Figure 1:
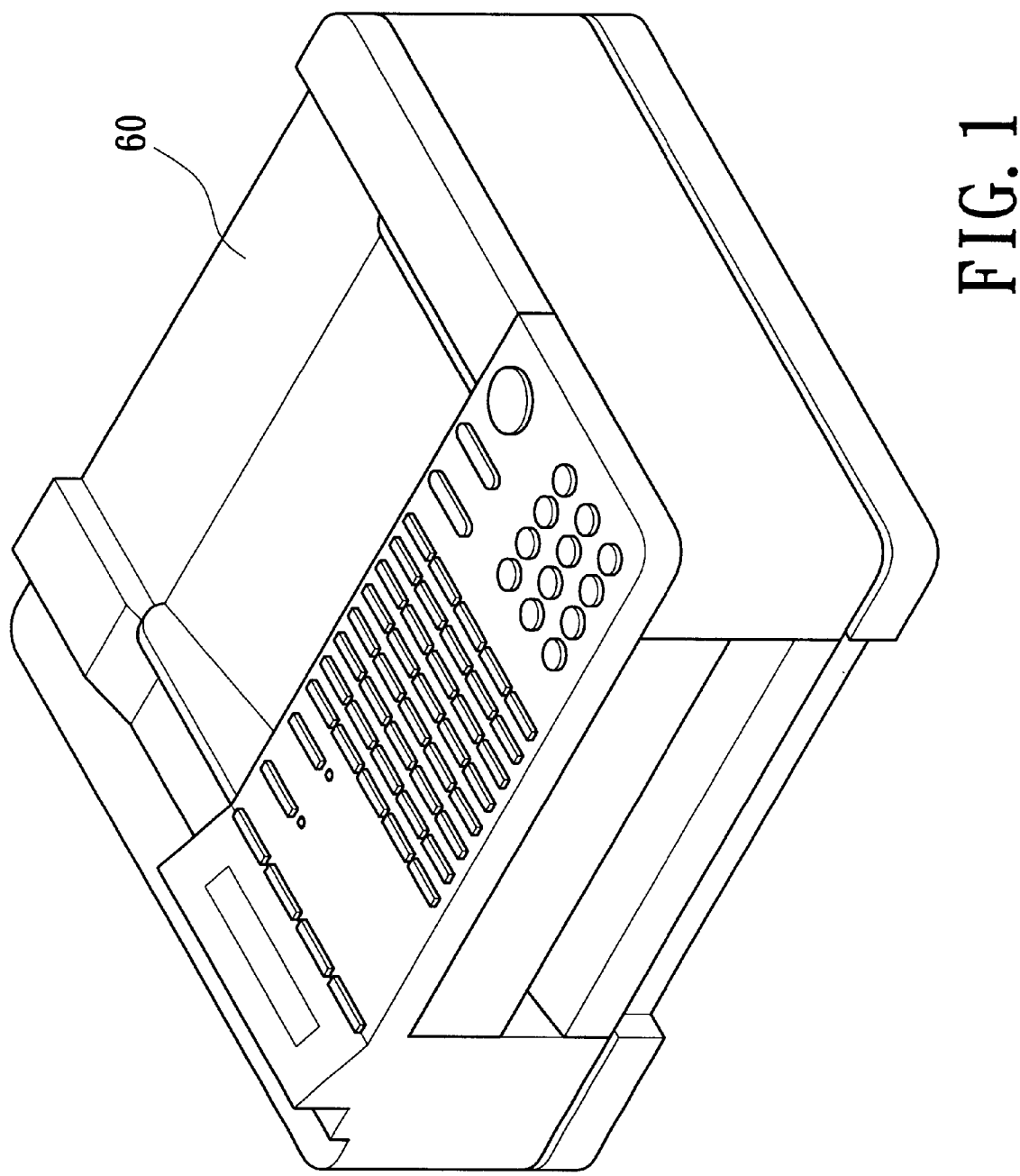
FIG. 1 is a schematic view of the operating panel in a prior art fax machine.
Figure 2:
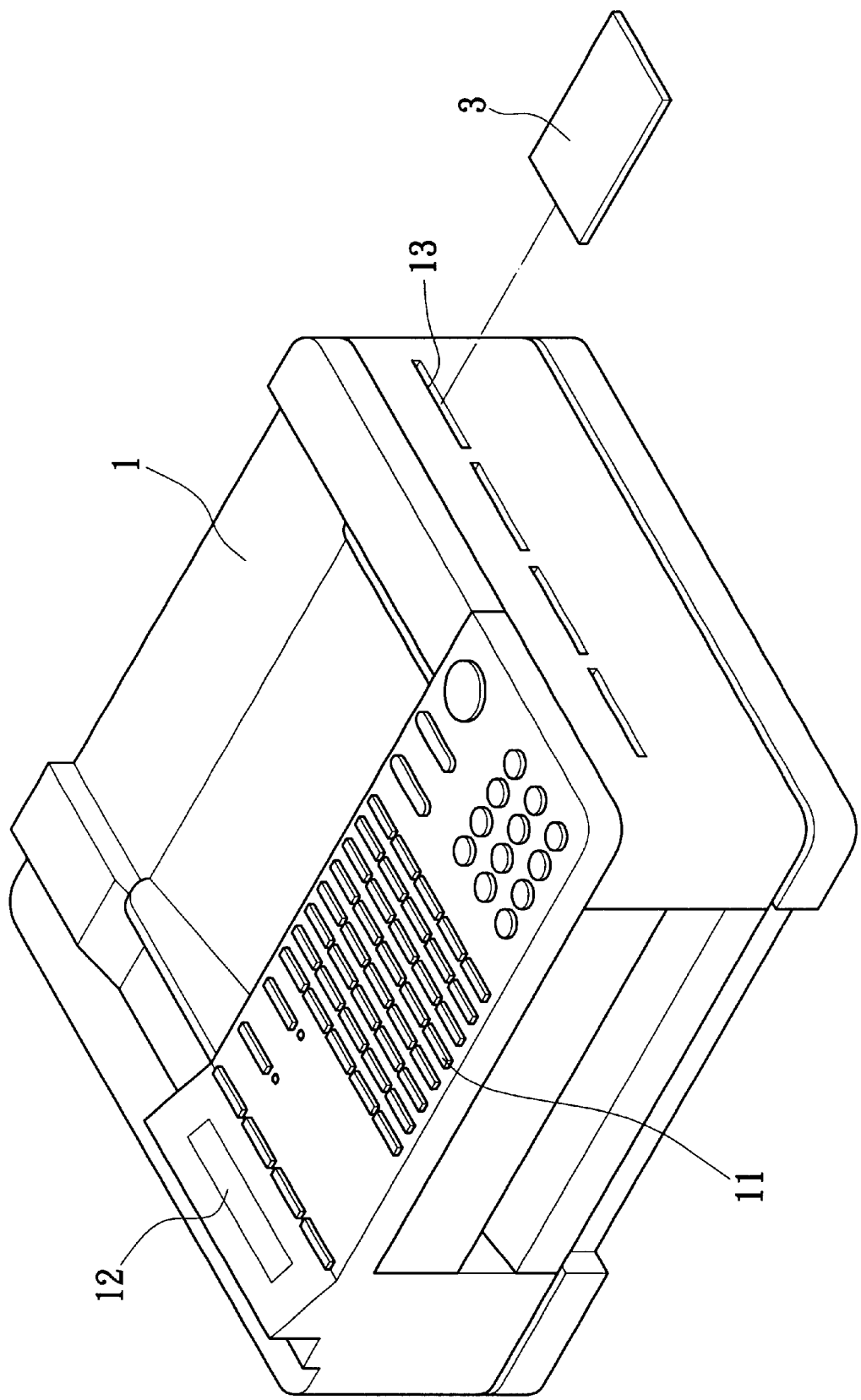
FIG. 2 shows the appearance of the present invention.
Figures 3, 4:
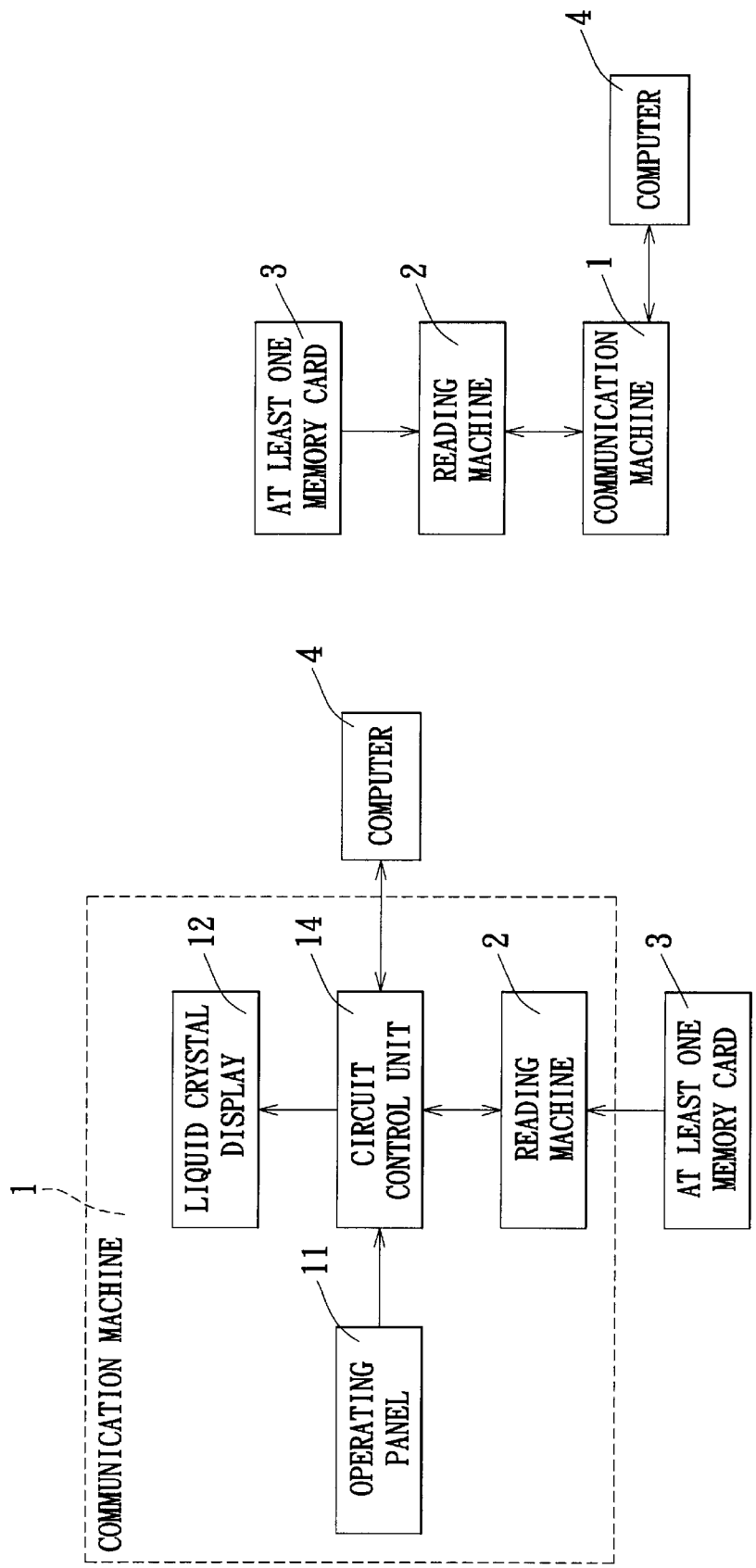
FIG. 3 is a structural schematic view of the present invention.
FIG. 4 is another structural view of the present invention.

Referring to FIGS. 2 and 3, a communication device for storing personal or department data of the present invention is illustrated. The communication device for storing personal or department data according to the present invention comprises a communication machine 1, a reading machine 2 and at least one memory card 3.

The communication machine 1 is a fax machine, a digital copier or a multi-functional product (MFP). The communication machine is installed with an operating panel 11 having an one-touch dial function and a liquid crystal display 12 which are connected to an circuit control unit 14. The circuit control unit 14 is connected to a computer 4 for performing setting functions. A reading machine 2 is installed within the communication machine 1. The internal circuit of the reading machine 2 is communicated with the circuit control unit 14 within the communication machine 1. Since this is not the main point of the present invention, the details will not be described here. At least one card-inserting seat 13 for being inserted by the memory card 3 is input. Each card-inserting seat 13 is connected to the internal circuit of the reading machine 2.

The reading machine 2 reads data from the memory card 3 as the memory card 3 is inserted into the card-inserting seat 13 for replacing the one-touch dial function in the communication machine 1.

The memory card 3 uses a non volatile memory, such as a random access memory card with standby batteries, a flash memory card or IC card, etc.

The memory card 3 serves to store the information relating personal or department telephones, such as one-touch dial, speed dial, group dial; and so on, telephone numbers, or e-mail addresses, etc. The memory card 3 also stores the setting of personal or department machines, such as settings of illumination; personal or department data, such as user's names, department codes, etc. The contents in the memory card 3 are inputted by the manufacturer, or the communication machine 1 may add data to the memory card 3.

When the operator desires to use the communication machine, the operator is only needed to insert the memory card 3 into the card-inserting seat 13 of the communication machine 1. Thereby, the reading machine 2 can read the data stored in the memory card 3.

On the contrary, the operator may use the functions on the operating panel 11 of the communication machine 1.

With reference to FIG. 4, the reading machine 2 of the present invention can be installed out of the communication machine 1. Thereby, the reading machine 2 may read data stored in the memory card 3 and then transfers the data to the communication machine 1 to perform the respective functions.

In summary, through the design of the present invention, the present invention has the following advantages:

(1) The present invention causes a communication machine to be used conveniently (2) Since the web site or e-mail address are input directly by. the user, the function of one-touch dial is effective, and thus, users use the present invention more conveniently.

(3) The memory cards are distributed according to the number of the users.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A communication device adapted for personalization by a plurality of users, said communication device comprising:

a control circuit for controlling operations thereof;

an operating panel coupled to said control circuit for manual entry thereto, said operating panel including controls for one-touch dialing functions;

a liquid crystal display coupled to said control circuit;

a plurality of memory cards for respective use by a plurality of users, each of said memory cards having personalization data and device settings of said communication device stored thereon and corresponding to a particular one of the users; and, at least one memory card reader coupled to said control circuit for reading said stored personalization data and device settings from a respective one of said memory cards, said control circuit adjusting operation of said communication device responsive to reading said device settings from a respective one of said memory cards and setting said one-touch dialing functions and entering user identification data responsive to reading said personalization data from said memory card.

* * * * *